United States Patent
Fouda et al.

(10) Patent No.: US 12,013,370 B2
(45) Date of Patent: Jun. 18, 2024

(54) ELECTROMAGNETIC PIPE INSPECTION INVERSION WITH ADAPTIVE FILTER FOR ARTIFACT REMOVAL

(71) Applicant: Halliburton Energy Services, Inc., Houston, TX (US)

(72) Inventors: Ahmed E. Fouda, Pearland, TX (US); Junwen Dai, The Woodlands, TX (US); Freeman L. Hill, Magnolia, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 232 days.

(21) Appl. No.: 17/850,008

(22) Filed: Jun. 27, 2022

(65) Prior Publication Data

US 2023/0417705 A1 Dec. 28, 2023

(51) Int. Cl.
*G01N 27/82* (2006.01)
*G01B 7/06* (2006.01)

(52) U.S. Cl.
CPC .............. *G01N 27/82* (2013.01); *G01B 7/10* (2013.01)

(58) Field of Classification Search
CPC ................................. G01N 27/82; G01B 7/10
See application file for complete search history.

(56) References Cited

U.S. PATENT DOCUMENTS

| | | | |
|---|---|---|---|
| 7,960,969 B2 | 6/2011 | Mouget et al. | |
| 9,715,034 B2 | 7/2017 | Omeragic et al. | |
| 9,977,144 B2 | 5/2018 | David et al. | |
| 2018/0074220 A1 | 3/2018 | David et al. | |
| 2018/0106141 A1 | 4/2018 | Fouda et al. | |
| 2018/0106764 A1 | 4/2018 | Fouda et al. | |
| 2019/0218904 A1 | 7/2019 | Fouda et al. | |
| 2020/0271818 A1 | 8/2020 | Fouda et al. | |
| 2020/0309986 A1* | 10/2020 | Donderici | G01V 3/26 |

(Continued)

OTHER PUBLICATIONS

Abstract of S. M. Haugland, "Fundamental analysis of the remote-field eddy-current effect", IEEE Transactions on Magnetics, vol. 32, No. 4, pp. 3195-3211, 1996; retrieved from https://ieeexplore.ieee.org/abstract/document/508383/ on Jun. 27, 2022.

(Continued)

*Primary Examiner* — Dominic E Hawkins
(74) *Attorney, Agent, or Firm* — NOVAK DRUCE CARROLL LLP

(57) ABSTRACT

Aspects of the subject technology relate to systems, methods, and computer-readable media for accounting for artifacts in pipe measurements made by an electromagnetic pipe inspection tool. Measurements gathered in a plurality of pipes across different depth points are accessed. Initial estimates of an attribute associated with the plurality of pipes are made for each pipe and a total estimate of the attribute for the plurality of pipes as a whole are made across the different depth points. Corresponding initial estimates of the attribute for each pipe are filtered to remove an artifact present in at least one of the corresponding initial estimates while the total estimate is preserved. Corresponding final estimates of the attribute for each pipe are determined based on both the measurements and corresponding filtered initial estimates of the attribute for each pipe. Integrity of each pipe can be determined based on the corresponding final estimates of the attribute.

20 Claims, 12 Drawing Sheets

(56) References Cited

U.S. PATENT DOCUMENTS

| | | | |
|---|---|---|---|
| 2020/0378240 A1* | 12/2020 | Fouda | E21B 47/08 |
| 2021/0054731 A1* | 2/2021 | Fouda | G01N 27/902 |
| 2021/0189858 A1* | 6/2021 | Donderici | E21B 47/002 |
| 2022/0057367 A1* | 2/2022 | Claudio | G06N 5/01 |
| 2022/0178245 A1 | 6/2022 | Fouda et al. | |

OTHER PUBLICATIONS

Abstract for J. Garcia et al., "Successful application of a new electromagnetic corrosion tool for well integrity evaluation in old wells completed with reduced diameter tubular," IPTC 16997; retrieved from https://www.researchgate.net/publication/301912487 on Jun. 27, 2022.

International Search Report & Written Opinion; PCT Application No. PCT/US2022/035221; mailed Mar. 17, 2023.

* cited by examiner

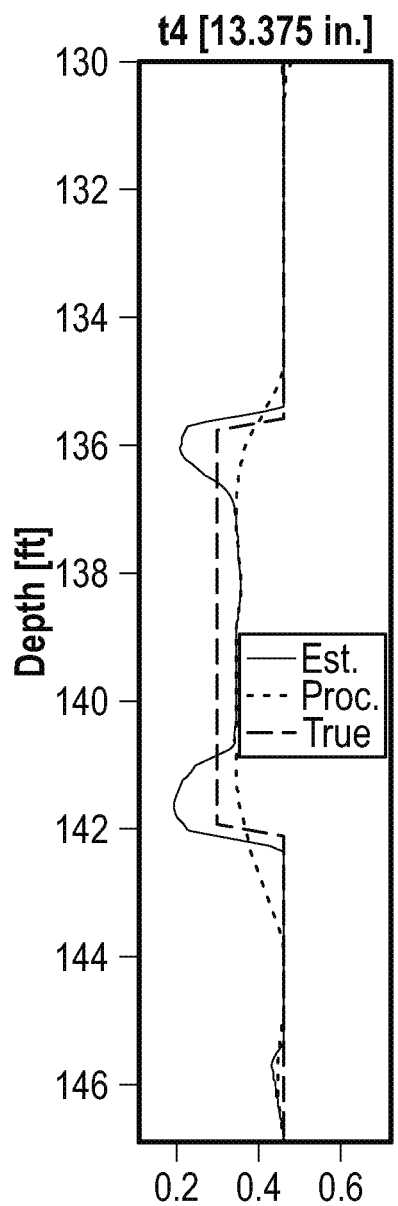
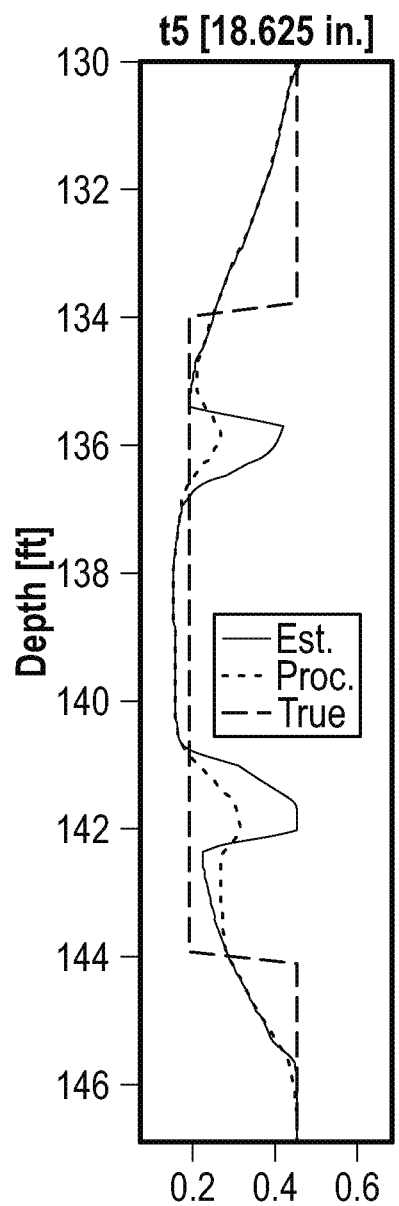
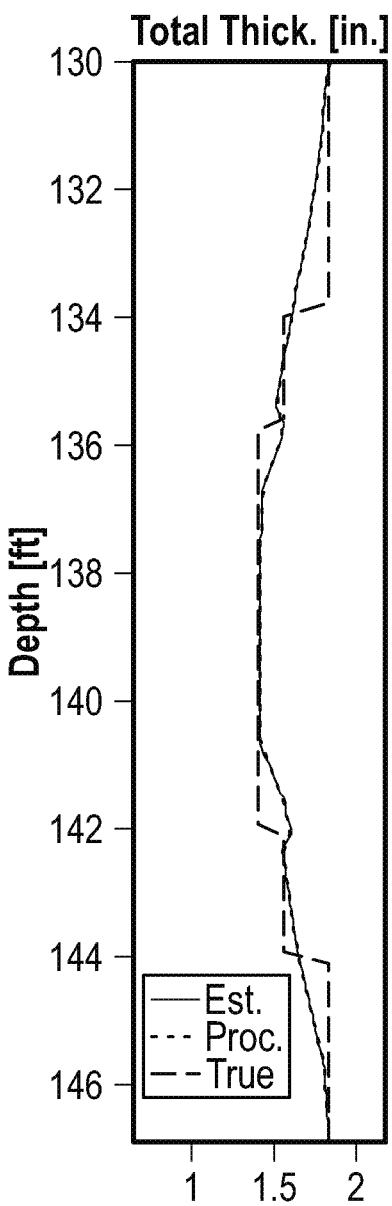
FIG. 7D
FIG. 7E
FIG. 7F

ELECTROMAGNETIC PIPE INSPECTION INVERSION WITH ADAPTIVE FILTER FOR ARTIFACT REMOVAL

TECHNICAL FIELD

The present technology pertains to accounting for artifacts in pipe measurements made by an electromagnetic pipe inspection tool, and more particularly, to adaptive filtering to account for artifacts in pipe measurements made by an electromagnetic pipe inspection tool.

BACKGROUND

Electromagnetic pipe inspection tools have been developed for generating logs/representations of conditions downhole in wellbores. Specifically, electromagnetic pipe inspection tools and associated imaging techniques are used to monitor conditions of pipes in hydrocarbon wellbores that include various kinds of casing strings and tubing. One common electromagnetic imaging technique is the eddy current technique. In the eddy current technique, when a transmitter coil of an electromagnetic pipe inspection tool emits primary transient electromagnetic fields, eddy currents are induced in regions, e.g. the casing, surrounding the tool. As follows, these eddy currents produce secondary fields which are received along with the primary fields by a receiver coil of the electromagnetic pipe inspection tool. This acquired data can then be used in evaluating surroundings in the wellbore, e.g. pipes, to the tool.

Electromagnetic pipe inspection tools can have multiple transmitter-receiver spacings and frequencies configurations, which allow the tools to distinguish between signals that originate from anomalies on different nested pipes. In distinguishing between signals that originate from different pipes, the integrity of the pipes can be analyzed on a pipe-by-pipe level of granularity. Specifically, an approach, herein referred to as "inversion," can be employed to translate multiple complementary measurements obtained by multiple receivers for multiple channels into pipe geometrical and electrical properties for specific pipes. Current approaches for performing inversion, however, are deficient for numerous reasons. In particular, current approaches for performing inversion in analyzing electromagnetic pipe inspection tool measurements on a pipe level of granularity of pipes amongst a plurality of downhole pipes is deficient.

BRIEF DESCRIPTION OF THE DRAWINGS

In order to describe the manner in which the features and advantages of this disclosure can be obtained, a more particular description is provided with reference to specific embodiments thereof which are illustrated in the appended drawings.

Understanding that these drawings depict only exemplary embodiments of the disclosure and are not therefore to be considered to be limiting of its scope, the principles herein are described and explained with additional specificity and detail through the use of the accompanying drawings.

FIGS. 7A-F are graphs of pipe thickness as a function of depth for different pipes and an overall cumulative thickness of the pipes as a function of depth, in accordance with various aspects of the subject technology.

DETAILED DESCRIPTION

Figure 1A:
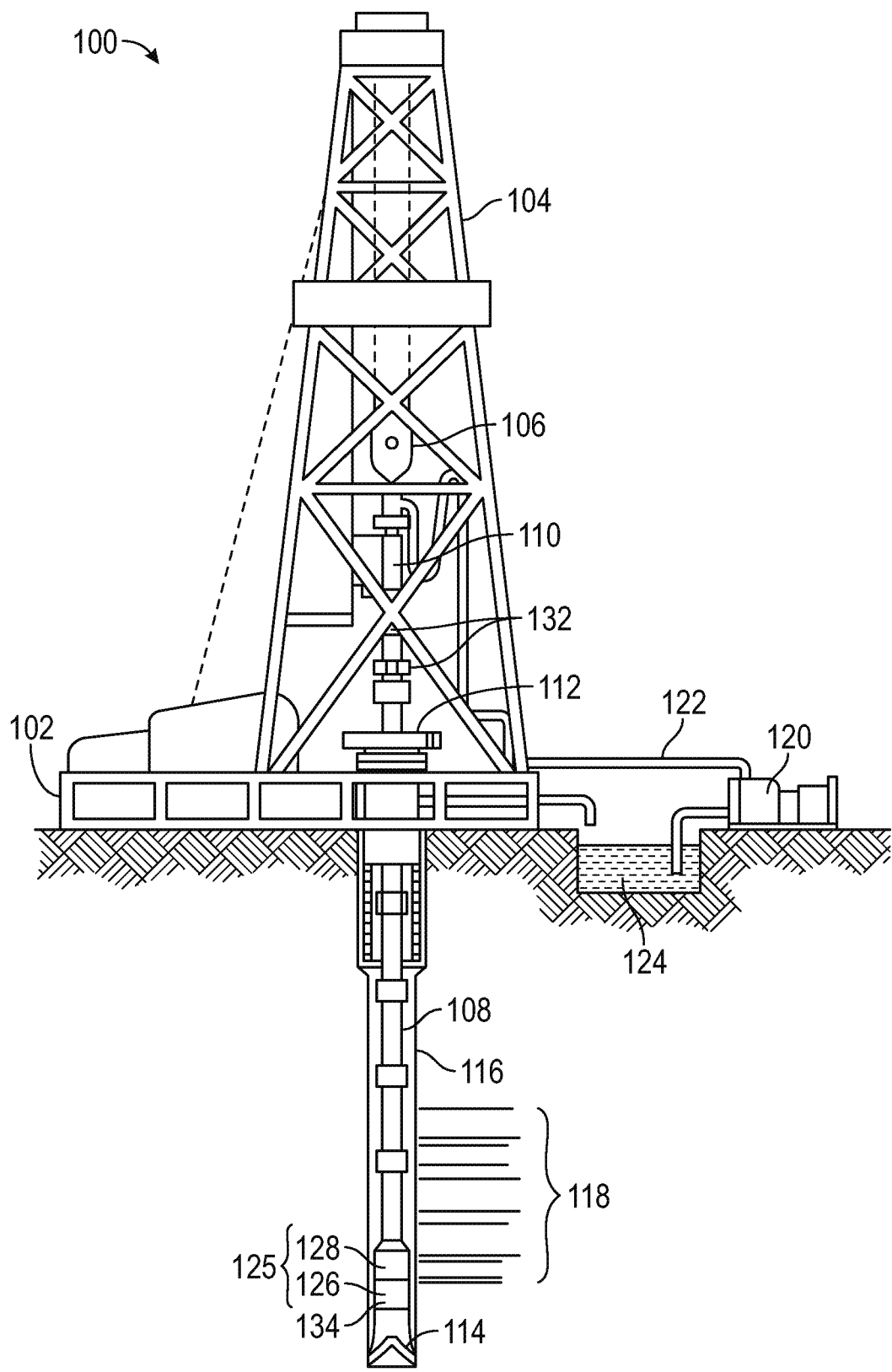
FIG. 1A is a schematic diagram of an example logging while drilling wellbore operating environment, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

As discussed previously, current approaches for performing inversion however are deficient for numerous reasons. In particular, current approaches for performing inversion in analyzing electromagnetic pipe inspection tool measurements on a pipe level of granularity of pipes amongst a plurality of downhole pipes is deficient. For example, to achieve high processing speeds in analyzing electromagnetic pipe inspection tool measurements, a one-dimensional inversion can be applied to approximate pipe properties over a range of depths. However, this approach can cause artifacts due to the mismatch between the one-dimensional model and two-dimensional and three-dimensional features that actually exist in the pipe, e.g. corrosion edges in the pipe structure. As a result, it is difficult to predict the occurrence of artifacts created based on dimensionality differences. Further, if measurements are captured over a noisy channel, the inverted results usually show fluctuation over the region subject to noise. In general, artifacts created due to these reasons usually exhibit a sharp deviation that does not conform with attribute representation that are cumulated over multiple pipes. This can make it difficult to filter these artifacts from measurements to accurately characterize conditions downhole. There therefore exist needs for workflows that can invert the pipe attributes (including pipe thickness, electrical properties, and eccentricity) from measurements while also precisely identifying and effectively removing artifacts.

The disclosed technology addresses the foregoing by applying an adaptive filter both before and after a core of a workflow, e.g. inversion, to accurately identify and remove the artifacts exhibiting sharp deviation and partially or completely remove them. Further, the disclosure technology applies an adaptive filter based on conserving a total value of an attribute measured across a plurality of features, e.g. pipes, and using the filter to identify and correct for artifacts on individual features without changing the total value of the attribute across the features. It is noted that the total value of the attribute is less affected by artifacts than the individual values of the attribute for each feature of the plurality of features. Further, while the disclosed technology is discussed with reference to downhole pipes, the technology can be practiced with respect to applicable downhole features that are capable of being characterized through an electromagnetic pipe inspection tool.

In various embodiments, a method can include accessing measurements at different depth points of a plurality of pipes in a case environment. An initial estimate of an attribute associated with the plurality of pipes can be determined for each pipe of the plurality of pipes across the different depth points based on the measurements. Further, a total estimate of the attribute for the plurality of pipes as a whole can be identified across the different depth points. Additionally, the corresponding initial estimates of the attribute for the each pipe of the plurality of pipes can be filtered to remove an artifact present in at least one of the corresponding initial estimates of the attribute present across at least a portion of the different depth points while preserving the total estimate of the attribute. Corresponding final estimates of the attribute for the each pipe of the plurality of pipes can be determined based on both the measurements and corresponding filtered initial estimates of the attribute for the each pipe of the plurality of pipes. Further, an integrity of a pipe of the plurality of pipes can be identified based on a corresponding final estimate of the attribute for the pipe.

In various embodiments, a method can include accessing measurements at different depth points of a plurality of pipes in a downhole environment. The method can also include determining a total estimate of thickness for the plurality of pipes as a whole across the different depth points based on the measurements. Further, the method can include determining corresponding initial estimates of the thickness for each pipe of the plurality of pipes based on the measurements. Additionally, the method can include filtering the corresponding initial estimates of the thickness for the each pipe to remove an artifact present in at least one of the corresponding initial estimates of the thickness across at least a portion of the different depth points. The corresponding initial estimates of the thickness for the each pipe can be filtered based on the total estimate of thickness for the plurality of pipes as the whole. The filtering can be performed while preserving the total estimate of the thickness for the plurality of pipes as the whole. The method can also include identifying an integrity of a pipe of the plurality of pipes based on a corresponding filtered initial estimate of the thickness of the pipe.

In various embodiments, a system can include one or more processors and at least one computer-readable storage medium storing instructions which, when executed by the one or more processors, cause the one or more processors to access measurements at different depth points of a plurality of pipes in a downhole environment. The instructions can also cause the one or more processors to determine an initial estimate of an attribute associated with the plurality of pipes for each pipe of the plurality of pipes across the different depth points based on the measurements. Further, the instructions can cause the one or more processors to identify a total estimate of the attribute for the plurality of pipes as a whole across the different depth points. Additionally, the instructions can cause the one or more processors to filter the corresponding initial estimates of the attribute for the each pipe of the plurality of pipes to remove an artifact present in at least one of the corresponding initial estimates of the attribute present across at least a portion of the different depth points while preserving the total estimate of the attribute. The instructions can also cause the one or more processors to determine corresponding final estimates of the attribute for the each pipe of the plurality of pipes based on both the measurements and corresponding filtered initial estimates of the attribute for the each pipe of the plurality of pipes. Further, the instructions can cause the one or more processors to identify an integrity of a pipe of the plurality of pipes based on a corresponding final estimate of the attribute for the pipe.

Turning now to FIG. 1A, a drilling arrangement is shown that exemplifies a Logging While Drilling (commonly abbreviated as LWD) configuration in a wellbore drilling scenario 100. Logging-While-Drilling typically incorporates sensors that acquire formation data. Specifically, the drilling arrangement shown in FIG. 1A can be used to gather formation data through an electromagnetic pipe inspection tool as part of logging the wellbore using the electromagnetic pipe inspection tool. The drilling arrangement of FIG. 1A also exemplifies what is referred to as Measurement While Drilling (commonly abbreviated as MWD) which utilizes sensors to acquire data from which the wellbore's path and position in three-dimensional space can be determined. FIG. 1A shows a drilling platform 102 equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, it creates a wellbore 116 that passes through various subterranean formations 118. A pump 120 circulates drilling fluid through a supply pipe 122 to top drive 110, down through the interior of drill string 108 and out orifices in drill bit 114 into the wellbore. The drilling fluid returns to the surface via the annulus around drill string 108, and into a retention pit 124. The drilling fluid transports cuttings from the wellbore 116 into the retention pit 124 and the drilling fluid's presence in the annulus aids in maintaining the integrity of the wellbore 116. Various materials can be used for drilling fluid, including oil-based fluids and water-based fluids.

Logging tools 126 can be integrated into the bottom-hole assembly 125 near the drill bit 114. As the drill bit 114 extends the wellbore 116 through the formations 118, logging tools 126 collect measurements relating to various formation properties as well as the orientation of the tool and various other drilling conditions. The bottom-hole assembly 125 may also include a telemetry sub 128 to transfer measurement data to a surface receiver 132 and to receive commands from the surface. In at least some cases, the telemetry sub 128 communicates with a surface receiver 132 using mud pulse telemetry. In some instances, the telemetry sub 128 does not communicate with the surface, but rather stores logging data for later retrieval at the surface when the logging assembly is recovered.

Each of the logging tools 126 may include one or more tool components spaced apart from each other and communicatively coupled by one or more wires and/or other communication arrangement. The logging tools 126 may also include one or more computing devices communicatively coupled with one or more of the tool components. The one or more computing devices may be configured to control or monitor a performance of the tool, process logging data, and/or carry out one or more aspects of the methods and processes of the present disclosure.

In at least some instances, one or more of the logging tools 126 may communicate with a surface receiver 132 by a wire, such as wired drill pipe. In other cases, the one or more of the logging tools 126 may communicate with a surface receiver 132 by wireless signal transmission. In at least some cases, one or more of the logging tools 126 may receive electrical power from a wire that extends to the surface, including wires extending through a wired drill pipe.

Collar 134 is a frequent component of a drill string 108 and generally resembles a very thick-walled cylindrical pipe, typically with threaded ends and a hollow core for the conveyance of drilling fluid. Multiple collars 134 can be included in the drill string 108 and are constructed and intended to be heavy to apply weight on the drill bit 114 to assist the drilling process. Because of the thickness of the collar's wall, pocket-type cutouts or other type recesses can be provided into the collar's wall without negatively impacting the integrity (strength, rigidity and the like) of the collar as a component of the drill string 108.

Figure 1B:
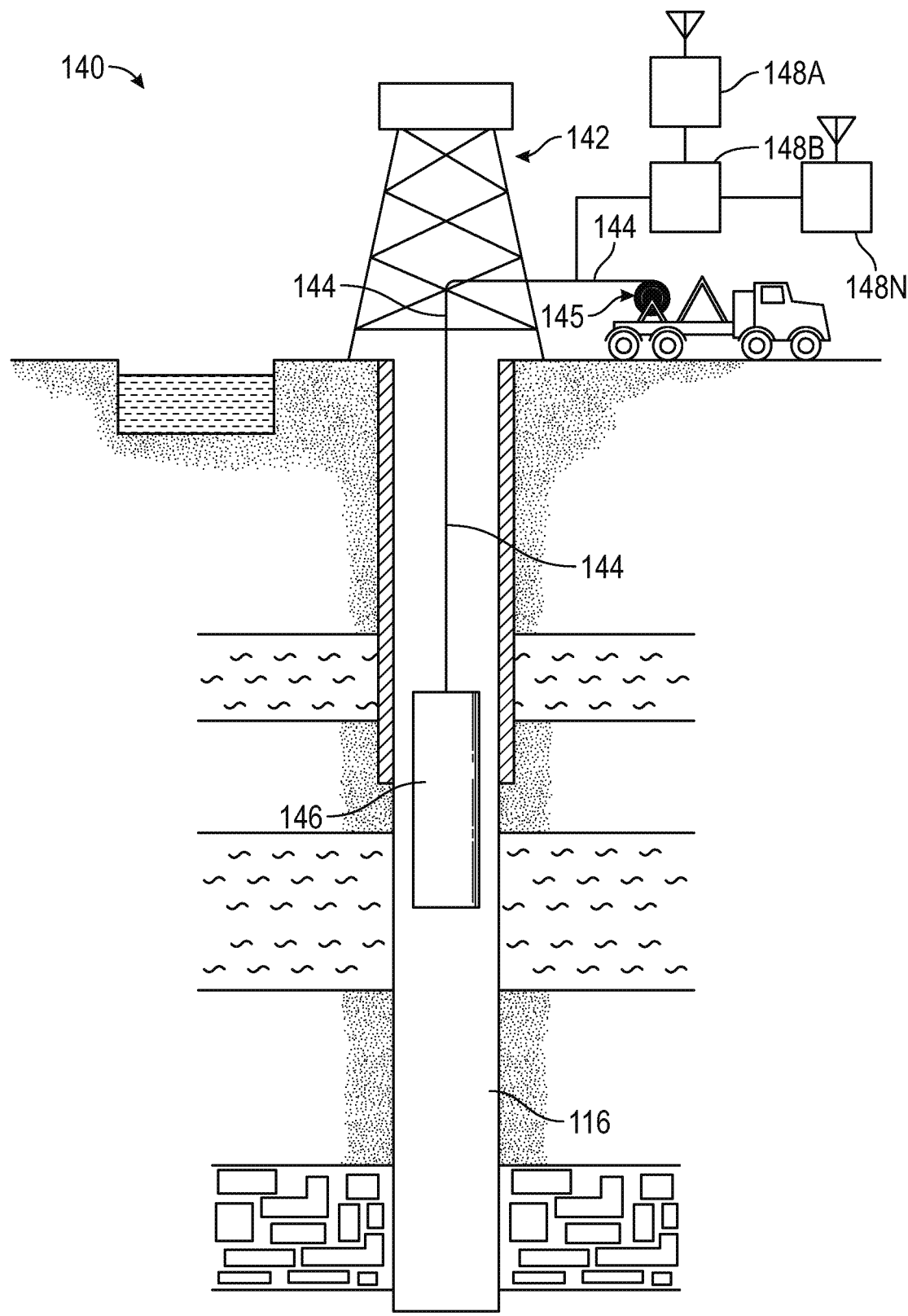
FIG. 1B is a schematic diagram of an example downhole environment having tubulars, in accordance with various aspects of the subject technology.

Referring to FIG. 1B, an example system 140 is depicted for conducting downhole measurements after at least a portion of a wellbore has been drilled and the drill string removed from the well. An electromagnetic pipe inspection tool can be operated in the example system 140 shown in FIG. 1B to log the wellbore. A downhole tool is shown having a tool body 146 in order to carry out logging and/or other operations. For example, instead of using the drill string 108 of FIG. 1A to lower tool body 146, which can contain sensors and/or other instrumentation for detecting and logging nearby characteristics and conditions of the wellbore 116 and surrounding formations, a wireline conveyance 144 can be used. The tool body 146 can be lowered into the wellbore 116 by wireline conveyance 144. The wireline conveyance 144 can be anchored in the drill rig 142 or by a portable means such as a truck 145. The wireline conveyance 144 can include one or more wires, slicklines, cables, and/or the like, as well as tubular conveyances such as coiled tubing, joint tubing, or other tubulars.

The illustrated wireline conveyance 144 provides power and support for the tool, as well as enabling communication between data processors 148A-N on the surface. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more of the processors 148A-N, which can include local and/or remote processors. Moreover, power can be supplied via the wireline conveyance 144 to meet power requirements of the tool. For slickline or coiled tubing configurations, power can be supplied downhole with a battery or via a downhole generator.

Figure 2:
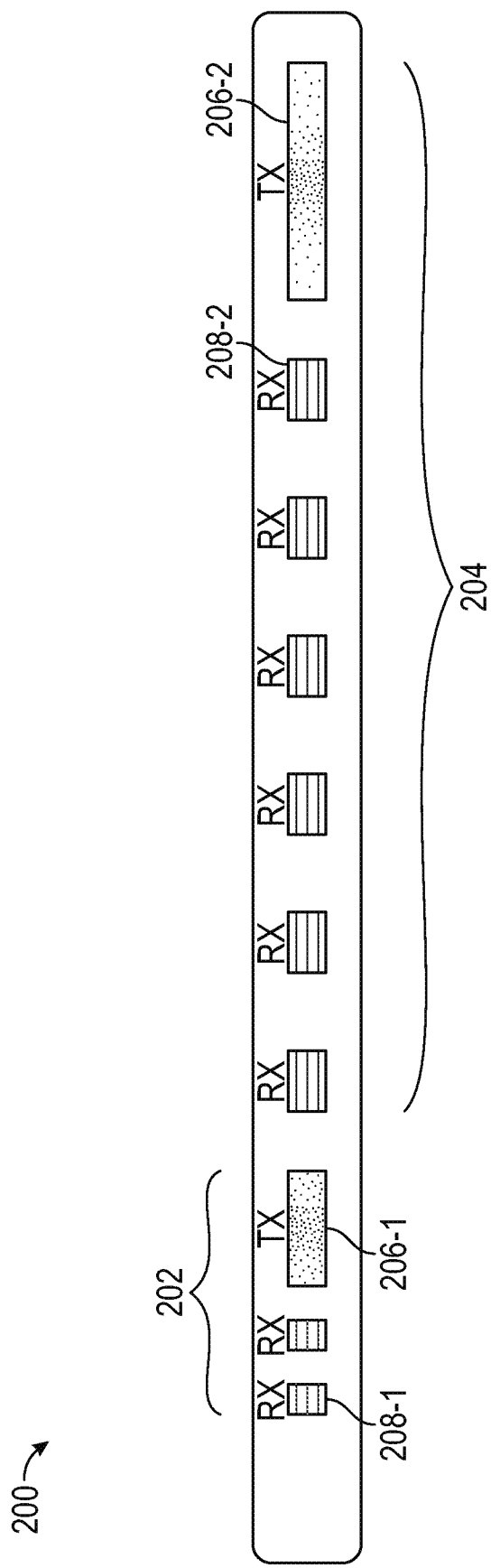
FIG. 2 illustrates a schematic diagram of a section of an example electromagnetic pipe inspection tool, in accordance with various aspects of the subject technology.

FIG. 2 illustrates a schematic diagram of a section of an example electromagnetic pipe inspection tool 200. The electromagnetic pipe inspection tool 200 can be operated in either a LWD system, such as the drilling scenario 100 shown in FIG. 1A, or a wireline system, such as the example system shown in FIG. 1B. Further, the electromagnetic pipe inspection tool 200 can be operated according to the techniques described herein. More specifically, the electromagnetic pipe inspection tool 200 can gather measurements that are processed using an adaptive filter to account for artifacts in the pipe measurements. In gathering measurements that are processed using an adaptive filter to account for artifacts, the electromagnetic pipe inspection tool 200 can operate in either a time-domain or a frequency-domain.

The example electromagnetic pipe inspection tool 200 consists of two groups of transmitting and receiving coil pairs. Specifically, the electromagnetic pipe inspection tool includes a shallow high resolution array 202 of transmitting and receiving coil pairs and a deep field resolution array 204 of transmitting and receiving coil pairs. Both the shallow high resolution array 202 and the deep field resolution array 204 can include an applicable number of transmitters/transmitter coils and an applicable number of receivers/receiver coils. Specifically, both the shallow high resolution array 202 and the deep field resolution array 204 can have one or more transmitters, e.g. 206-1 and 206-2, and one or more receivers, e.g. 208-1 and 208-2.

In operation, transmitters in the corresponding shallow high resolution array 202 and the deep field resolution array 204 transmit signals into surroundings of the electromagnetic pipe inspection tool 200. As follows, corresponding receivers of the shallow high resolution array 202 and the deep field resolution array 204 receive the transmitted signals after the signals have been affected by the surroundings. For example, features downhole can modify the transmitted signals and the received signals can reflect such modifications. Specifically, the received signals of the electromagnetic pipe inspection tool 200 correspond to downhole measurements that can be used to characterize the surroundings of the electromagnetic pipe inspection tool 200 disposed downhole. For example, the technology described herein can be applied to measurements gathered by the electromagnetic pipe inspection tool 200 to characterize the integrity of downhole pipes.

The shallow high resolution array 202 can operate at a relatively higher frequency, e.g. in comparison to the deep field resolution array 204. Accordingly, the excitation of the shallow high resolution array 202 can generate fields in a region that is closer to the tool 200, e.g. in comparison to a region around the tool corresponding to operation of the deep field resolution array 204. The deep field resolution array 204 uses a relatively lower frequency, e.g. in comparison to the shallow high resolution array 202. Accordingly, the excitation of the deep field resolution array 204 can be generated with relatively longer transmitter-receiver, which can provide information from surrounding that are further away from the tool 200, e.g. in comparison to the region corresponding to operation of the shallow high resolution array 202. For example, measurements made through the deep field resolution array 204 can be used in characterizing outer pipes surrounding the tool 200 when the tool is disposed downhole.

Figure 3:
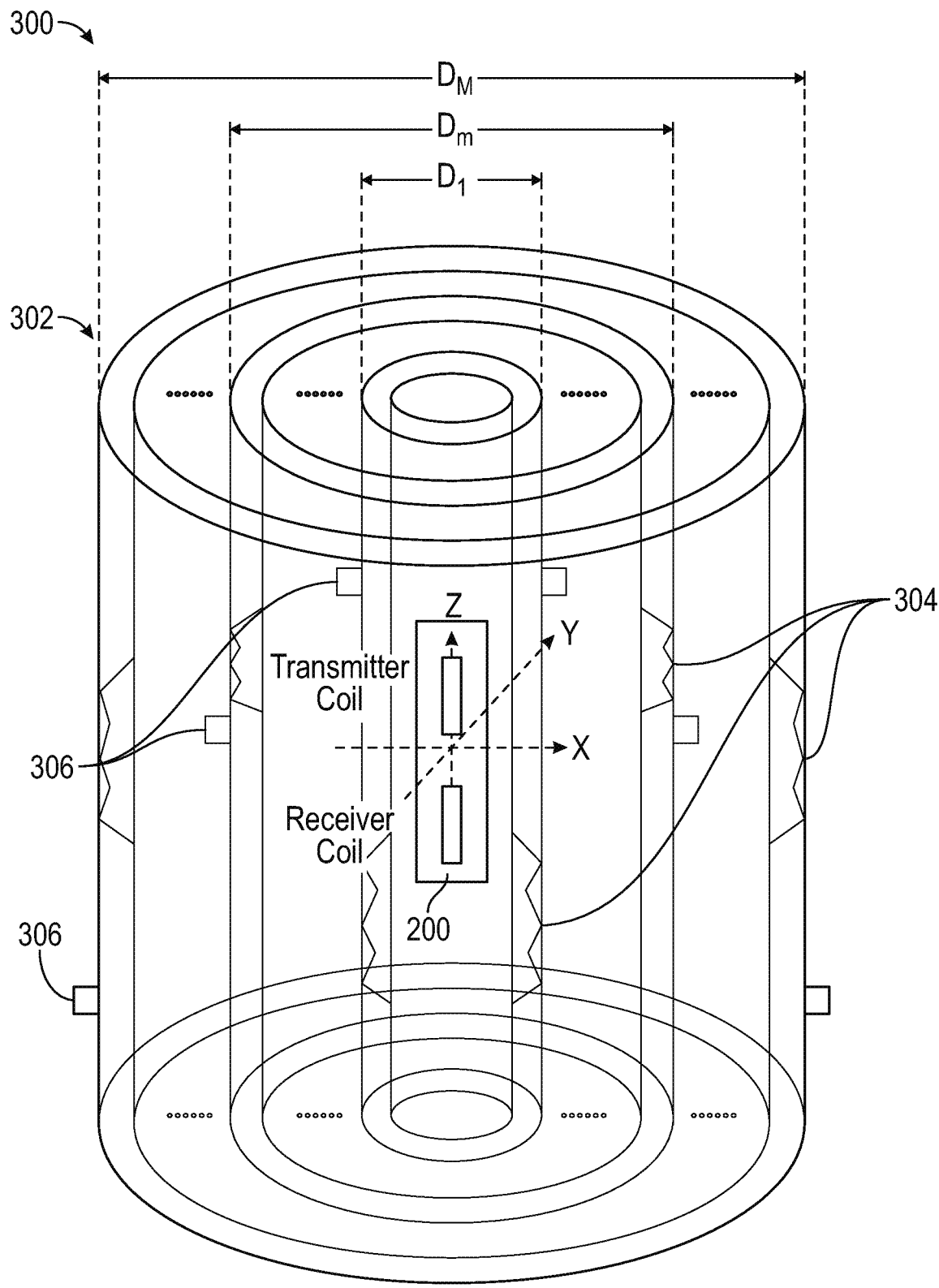
FIG. 3 illustrates a schematic representation of an environment including the electromagnetic pipe inspection tool disposed in a nested pipe configuration, in accordance with various aspects of the subject technology.

FIG. 3 illustrates a schematic representation of an environment 300 including the electromagnetic pipe inspection tool 200 disposed in a nested pipe configuration 302. The nested pipe configuration 302 can exist downhole. As follows, the electromagnetic pipe inspection tool 200 can be disposed downhole to gather measurements for characterizing the pipes in the nested pipe configuration 302 according to the technology described herein. The nested pipe configuration 302 includes concentric pipes. The electromagnetic pipe inspection tool 200 deployed inside the nested pipe configuration 302 can gather measurements for characterizing anomalies that exist in the nested pipe configuration 302, e.g. corrosions 304 and collars 306. Specifically, as the tool 200 moves within the nested pipe configuration 302, one or more transmitters are excited, and corresponding electromagnetic signals are received at one or more receivers and are recorded as part of downhole measurements gathered by the electromagnetic pipe inspection tool 200. The nested pipe configuration 302 shown in FIG. 3 is merely an example pipe configuration, and in various embodiments the electromagnetic pipe inspection tool 200 can be operated in different pipe configurations for characterizing features of the pipes.

With respect to the schematic of the electromagnetic pipe inspection tool 200, the varying transmitter-receiver spacings and operational frequencies that are achieved through the use of the shallow high resolution array 202 and the deep field resolution array 204 configurations allows the tool 200 to distinguish signals that originate from anomalies/features on different nested pipes in the nested pipe configuration 302. Because the received multiple complementary measurements are non-linear combinations of signals from different pipes, inversion can be used to translate the signals into individual pipe characteristics. As follows, a certain received signal combination, e.g. across the arrays 202 and 204, can be related to specific characteristics, e.g. a specific metal loss or gain, for each pipe. However and as discussed previously, several factors can complicate this process of interpretation. Specifically, the non-unique process of inversion where multiple solutions exist to the same problem, can complicate application of inversion to identify individual pipe characteristics. Further, inversion makes use of a one-dimensional forward solver to generate synthetic data and compare the synthetic data to the measured signal to determine the thickness of each pipe. However, the dimensionality mismatch between the model and features of the real pipe configurations can lead to artifacts in the interpreted results. These artifacts become even more pronounced when the tool is measuring anomalies, and in particular overlapping anomalies. Further, inversion is very sensitive to the measurements and channel noise can greatly distort the results.

Figure 4:
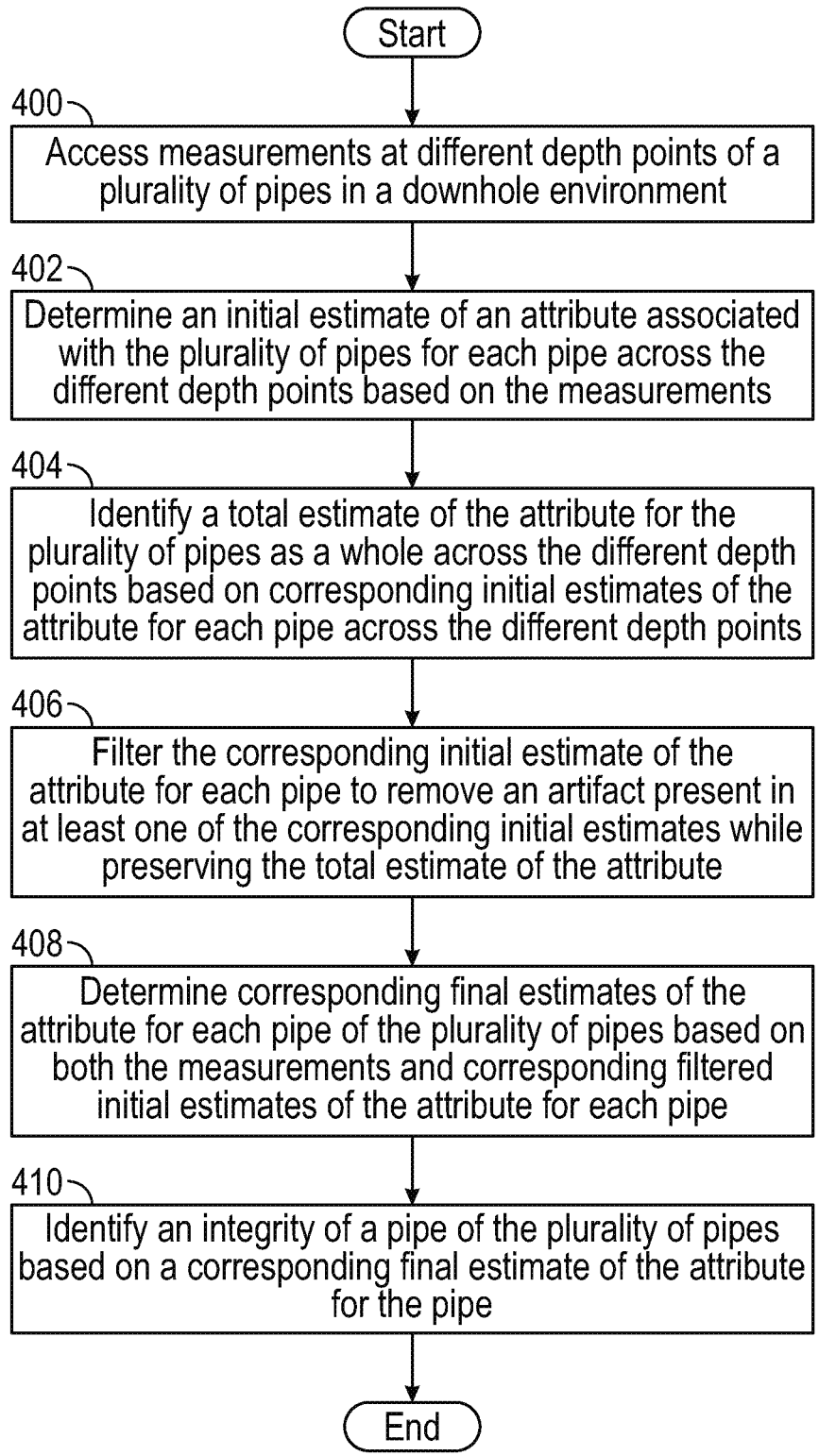
FIG. 4 illustrates a flowchart for an example method of identifying integrity of a pipe by applying adaptive filtering to account for artifacts in pipe measurements made by an electromagnetic pipe inspection tool, in accordance with various aspects of the subject technology.

The disclosure now continues with a discussion of techniques for overcoming the previously described deficiencies in relation to characterizing pipes through inversion. Specifically, FIG. 4 illustrates a flowchart for an example method of identifying integrity of a pipe by applying adaptive filtering to account for artifacts in pipe measurements made by an electromagnetic pipe inspection tool. The method shown in FIG. 4 is provided by way of example, as there are a variety of ways to carry out the method. Additionally, while the example method is illustrated with a particular order of steps, those of ordinary skill in the art will appreciate that FIG. 4 and the modules shown therein can be executed in any order and can include fewer or more modules than illustrated. Each module shown in FIG. 4 represents one or more steps, processes, methods or routines in the method.

At step 400, measurements of a plurality of pipes made at different depth points in a downhole environment are accessed. The measurements can be made by an applicable electromagnetic pipe inspection tool, such as the electromagnetic pipe inspection tool 200 represented in FIG. 2. Further, the pipes can be arranged in an applicable configuration downhole, such as a nested configuration.

Before the measurements are accessed, electrical properties of the pipes can be estimated. Electrical properties of the pipes can include applicable electrical characteristics of the pipes, such as electrical conductivity and permeability. The electrical properties can be estimated by minimizing the difference between signatures of the pipes extracted from the measurements and simulated signatures of the pipes using assigned electrical properties.

Further, the electrical properties can be estimated using an applicable technique, such as the Mu/Sigma Estimation Algorithm (herein "MSEA"). MESA searches for a combination of u/a that minimizes the mismatch between measured and synthetic signatures of features with known metal thickness such as collars and zone transitions in pipes. Zone transitions can occur when a string starts, ends, or changes thickness. This change will usually alter the electromagnetic response. With known thickness change, the signature change of zone transitions can provide a way to characterize the material properties of the pipes.

The measurements can then be calibrated based on the estimated electrical properties of the pipes. Specifically valid channels associated with the measurements can be calibrated to match the measured data with simulated responses using known nominal pipe parameters and estimated pipe properties. A direct calibration method can be achieved by measuring the response due to pipe configuration in the condition of nominal parameters. Then the measurement data can be calibrated to eliminate differences between the actual measurements and the measured response due to pipe configurations in the condition of nominal parameters. Alternatively, an in-situ calibration can be applied that statistically finds a response that occurs most frequently in representing a nominal response due to a nominal configuration. Then, at least a portion of the measurements can be modified based on the representative nominal response.

Next, at step 402, an initial estimate of an attribute associated with the plurality of pipes is determined for each pipe across the different depth points. Specifically, the initial estimates of the attribute can be determined for each pipe across the different depth points based on the measurements accessed at step 400. Attributes, as used herein, can include applicable characteristics of a pipe that can be determined based on measurements made by an electromagnetic pipe inspection tool. For example, an attribute can include a thickness of the pipe, a magnetic permeability of the pipe, an electrical conductivity of the pipe, and an eccentricity between different pipes. Estimates can be represented in an applicable form for describing the attribute. For example, the estimate of the attribute can be a curve that represents the attribute of a pipe across varying depth points.

The initial estimate of the attribute can be determined for the pipes using an applicable technique. Specifically, the initial estimate of the attribute can be determined using one or an applicable combination of calibration, model-based inversion, and machine learning, e.g. supervised machine learning. For example, an initial estimate of the attribute for each pipe can be determined through an initial guess estimation algorithm (herein "IGEA"). The IGEA can be an inversion without regularization terms and with constrained attributes from zero to nominal values. Results from this algorithm can preserve key features of the pipes, e.g., corrosion. The model-based inversion can be a radial one-dimensional inversion and the dimensionality mismatch can be accounted for by the adaptive filter that will be discussed in greater detail later.

At step 404, a total estimate of the attribute for the plurality of pipes as a whole is determined across the different depth points. For example, a total thickness of all pipes at a specific depth point can be determined as part of the total estimate of the attribute. The total estimate can be identified using an applicable technique. Specifically, the total estimate of the attribute can be identified by either summing up the corresponding initial estimates of the attribute or a filtered version of a sum of the corresponding initial estimates of the attribute. Further, the total estimate of the attribute can be identified directly from the measurements. More specifically, the total estimate of the attribute can be identified directly from the measurements using a process that is substantially different from a process that is used to determine the initial estimate of the attribute for each pipe at step 402.

At step 406, the corresponding initial estimate of the attribute is filtered for each pipe to remove an artifact present in a least one of the corresponding initial estimates. In filtering the corresponding initial estimates, the estimates of the attribute of each pipe can be filtered, however, only the corresponding pipes that have estimates which include the artifact can actually be modified to remove the artifact. For example, estimates of an attribute for pipes that are further away from the electromagnetic pipe inspection tool might not have an artifact that is present in estimates of the attribute for pipes that are closer to the tool. As a result, in filtering the estimates for the pipes that are further away, the estimates might not be modified to actually remove the artifact, as the artifact is not present.

In filtering the initial estimates of the attribute for each pipe at step 406, an adaptive filter is applied to sharp changes of initial estimates that do not conform with the total estimate determined at step 404. Such sharp changes can correspond to an artifact that arises from any of the previously described deficiencies that arise through application of the inversion process. Specifically, the artifact can arise from RID model mismatch created when a tool that gathers the measurements encounters 2-D features. Alternatively or in addition to, the artifact can arise from an inherent non-uniqueness of the inversion process.

Figure 5:
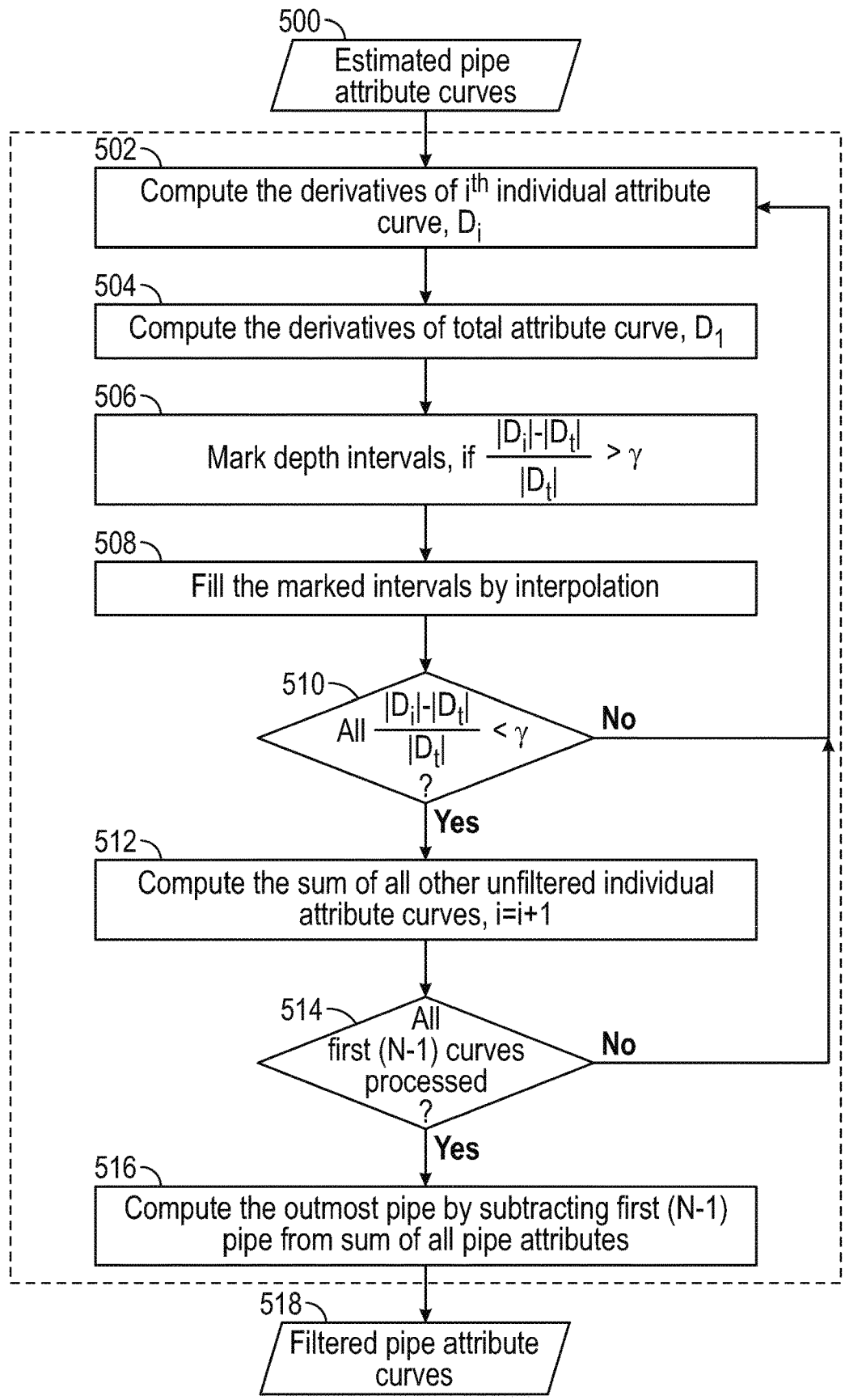
FIG. 5 illustrates a flowchart for an example method of removing artifacts in estimates of an attribute of a pipe through application of an adaptive filter, in accordance with various aspects of the subject technology.

FIG. 5 illustrates a flowchart for an example method of removing artifacts in estimates of an attribute of a pipe through application of an adaptive filter. The method shown in FIG. 5 is provided by way of example, as there are a variety of ways to carry out the method. Additionally, while the example method is illustrated with a particular order of steps, those of ordinary skill in the art will appreciate that FIG. 5 and the modules shown therein can be executed in any order and can include fewer or more modules than illustrated. Each module shown in FIG. 5 represents one or more steps, processes, methods or routines in the method.

At step 500 estimated pipe attributes/attribute curves are accessed. The estimated pipe attributes accessed at step 500 can be for individual pipes of a plurality of pipes, such as the initial estimate of the attribute determined for each pipe at step 402. Further, while reference is made to attribute curves throughout the discussion of the flowchart shown in FIG. 5, the method is not limited to attribute curves and can be applied to an applicable representation of the attribute/estimate of the attribute.

Next, regions in the estimates with artifacts are determined for the individual estimates of the attribute for each pipe. Specifically, in regions with abnormal artifacts, it is observed that the derivative of an individual attribute curve deviates greatly from a derivative of a total attribute curve/total estimate of the attribute. Accordingly, at step 502 the derivates of the attribute estimate of the $i^{th}$ pipe, denoted as $D_i$, is determined. At step 504, the derivates of the total estimate of the attribute, denoted as $D_t$, are determined. The derivative of an attribute curve with respect to logging depth can be a measure of the rate at which the curve value changes with respect to the change of the depth. Specifically, the derivative is the slope of the curve at each point. To identify the regions with abnormal artifacts, three steps need to be implemented. Numerically, the derivatives can be obtained by computing the differentiation. At step 506 regions are flagged that satisfy certain criterion as artifacts. For associated curves, for example the individual pipe thickness and total thickness of all pipes, the slopes should overall have similar trends. In one embodiment, a criterion $$\frac{|D_i| - |D_t|}{|D_t|} > \gamma$$

is set to determine the region for employing artifact removal algorithm. The predefined threshold $\gamma$ is adjustable, which determines the extension of region with artifacts. For example, the threshold can be 30%, 20%, 10%, or 0%.

After the regions are identified, filtered individual attribute curves, e.g. filtered initial estimates of the attribute for each pipe, are obtained. Many methods, for example the interpolation or extrapolation techniques, can be adopted to pad the data points within the identified regions at step 508. As one example, the piecewise cubic Hermite interpolation (herein "PCHIP") can be utilized to calculate values in a marked region. The interpolated value within the marked region can be based on a shape-preserving piecewise cubic interpolation of the values at neighboring points. Thus, the shape of curves can be well conserved. By using this technique, the values of the data points within marked regions can be re-evaluated according to the neighboring data points.

At decision point 510 it is determined whether the derivatives satisfy the criterion, and steps 502 through 508 are iteratively repeated until criterion is satisfied. Then, at step 512 the method proceeds to the next attribute curve and steps 504 through 512 are repeated until, as determined at decision point 514, the (N−1)$^{th}$ curve is filtered, where N is the number of attribute curves.

At step 516, the last attribute curve, e.g. the remaining initial estimate of the last pipe with an unfiltered estimate, is obtained. Specifically, the total attribute curve is much less sensitive to parameters used in the process of inversion than the individual curves. In other word, the variation of total attribute curve is very small. Therefore, it is meaningful to preserve the total attribute curve. In order to achieve this, once the artifacts on the first (N−1) attribute curves are identified and removed, the value of the last attribute curve can be calculated by subtracting the values of first (N−1) curves from the total attribute curve. After the last attribute curve is filtered at step 516, the resultant filtered attribute curves for each pipe are output at step 518.

Returning to the flowchart shown in FIG. 4, at step 408, corresponding final estimates of the attribute for each pipe are determined. Specifically, the final estimates of the attribute can be determined based on both the measurements and corresponding filtered initial estimates of the attribute for each pipe. In determining the final estimates of the attribute for each pipe, a regularization parameter can be estimated and applied. A regularization term can be used in the cost function to constrain the solution to a predicted physical solution. This can help mitigate non-uniqueness problem that arises in cases of four or greater pipes. The optimal regularization parameters can then be automatically determined in a way of minimizing correlation between different pipes. In turn, this can prevent undesired coupling between different pipe thicknesses due to the inversion problem.

The final individual pipe attributes can be estimated through inversion. As discussed previously, inversion is an iterative process where the signals generated from a forward model are matched to measurements. This is accomplished by making adjustments to the input parameters iteratively until a forward model of the input parameters matches the measurement responses. In the method shown by the flow in FIG. 4, the corresponding filtered estimates are matched to the measurements and the final individual pipe attributes are estimated based on such matchings.

The final estimates can be post processed. Specifically, post processing can remove artifacts existing in the inverted results including ghosts behind collars, double peak of collars, and eccentricity. For example, the ghosts behind collars can be mitigated and the double peak of collars can be combined. In addition, the eccentricity effect due to eccentric pipes can be corrected through post processing. These final estimates can also serve as input to further inversion processes. Specifically, the final estimates can serve as an initial guess to a second inversion.

At step 410, an integrity of a pipe can be identified. Specifically, an integrity of a pipe can be identified based on a corresponding final estimate of the attribute for the pipe. For example, the final estimate of thickness can indicate that severe corrosion is occurring on a pipe. In turn, such integrity can be monitored over time and remedial measures can be performed based on the determined integrity.

Figure 6:
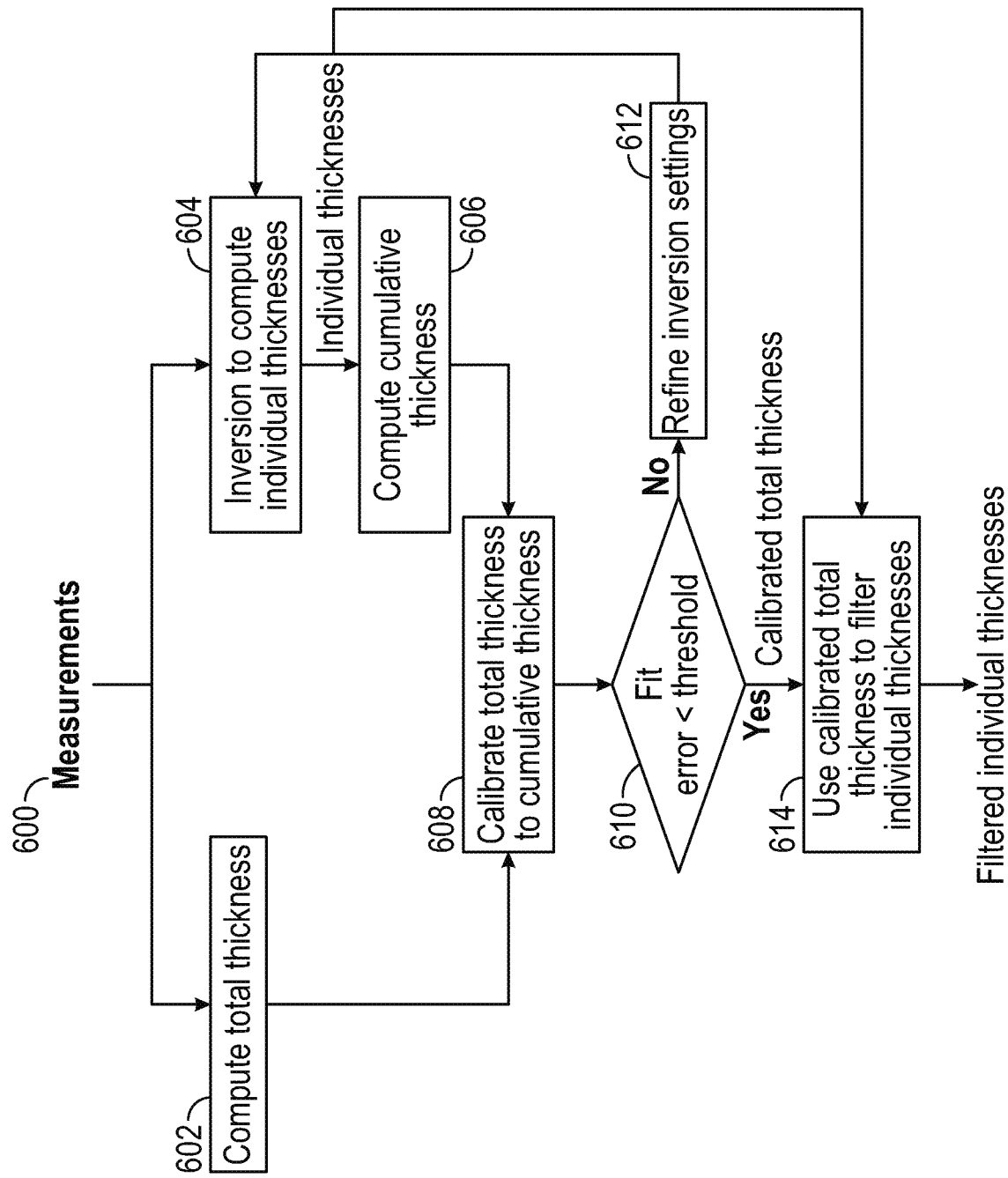
FIG. 6 illustrates a flowchart for an example method of an alternative method of computing total thickness directly from raw measurements to account for artifacts created in analyzing the integrity of pipes, in accordance with various aspects of the subject technology.
Figure 7A:
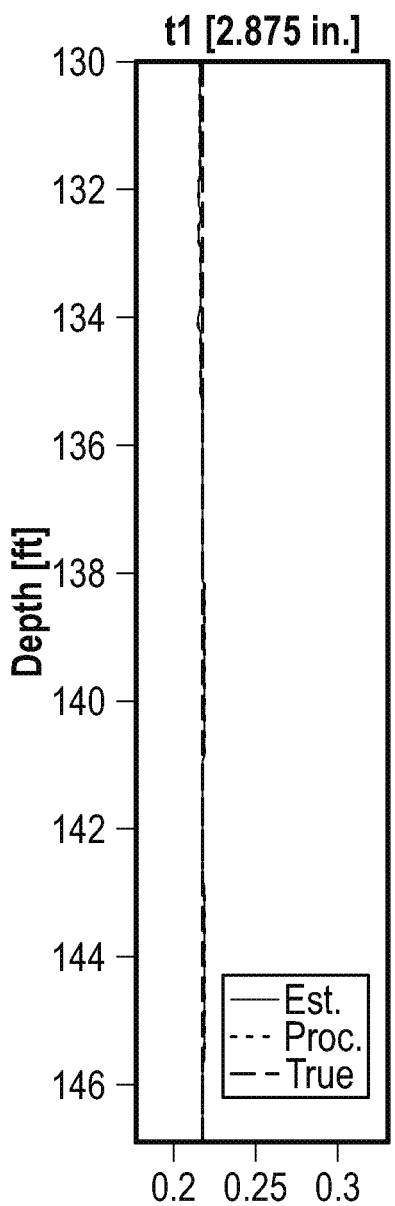
Figure 7B:
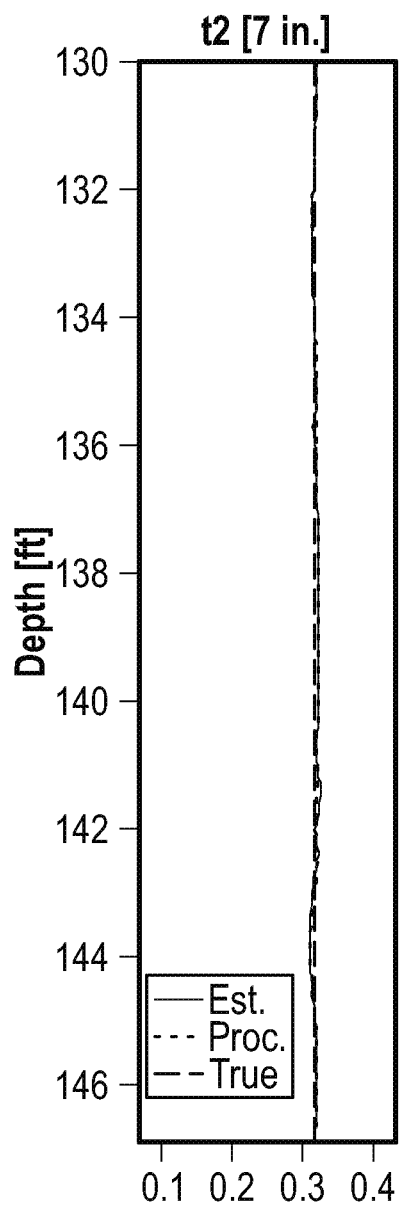
Figure 7C:
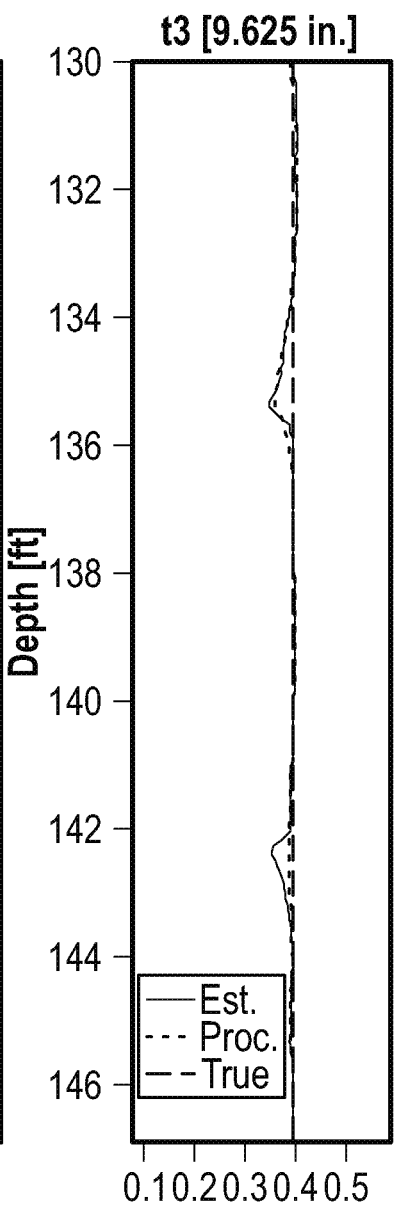
Figure 8A:
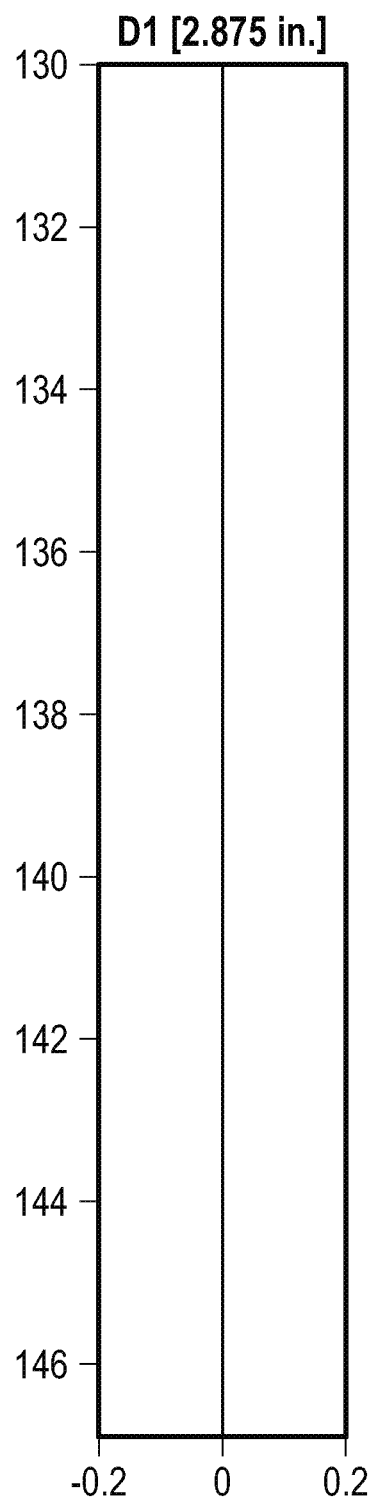
FIGS. 8A-F are corresponding derivatives of the thicknesses of the pipes and the cumulative thickness as a function of depth, in accordance with various aspects of the subject technology.
Figure 8B:
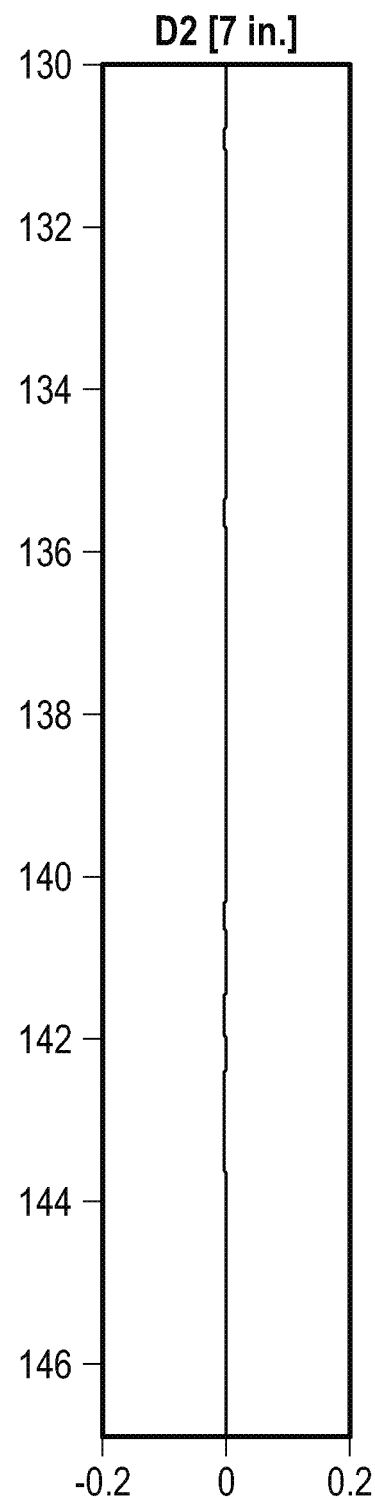
Figure 8C:
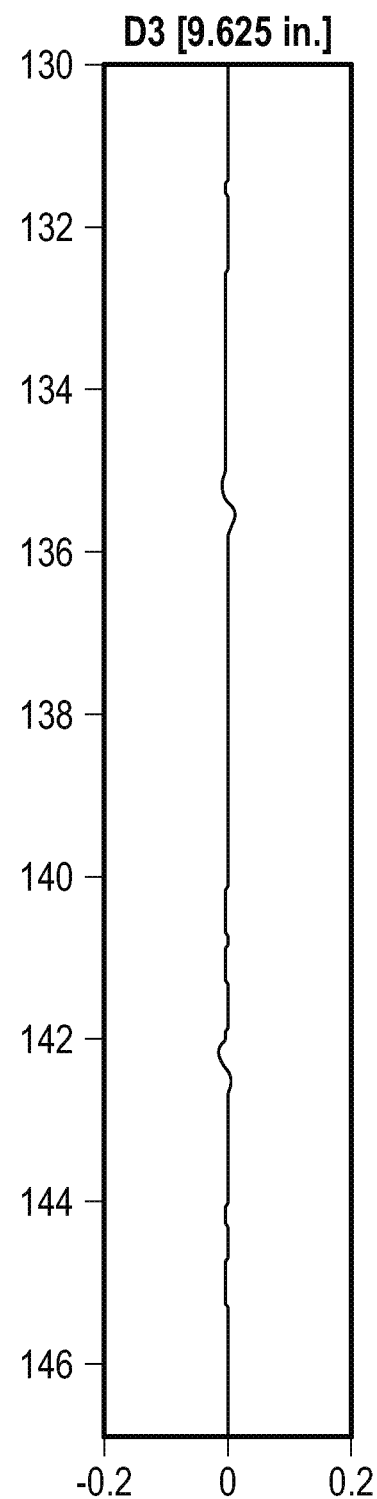
Figure 8D:
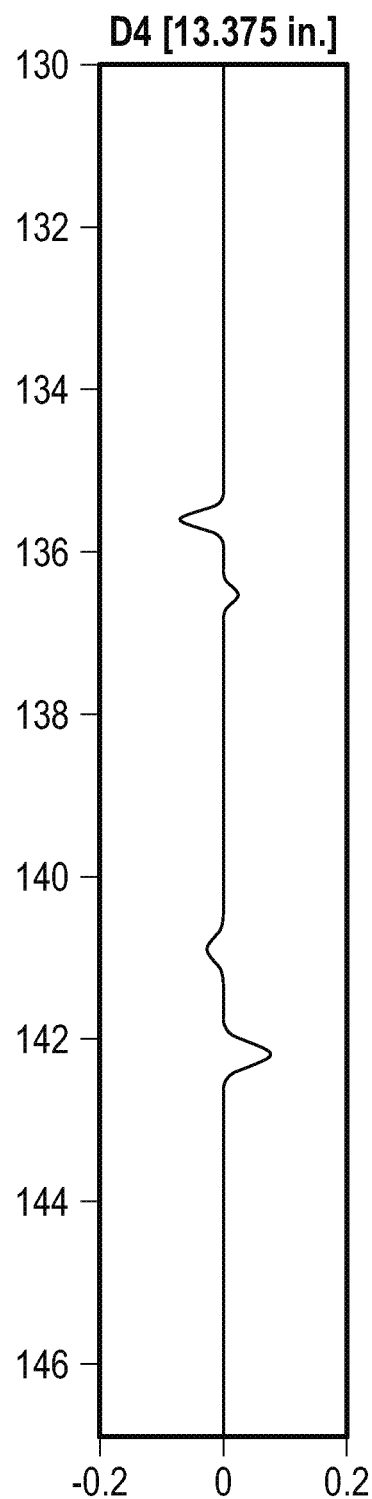
Figure 8E:
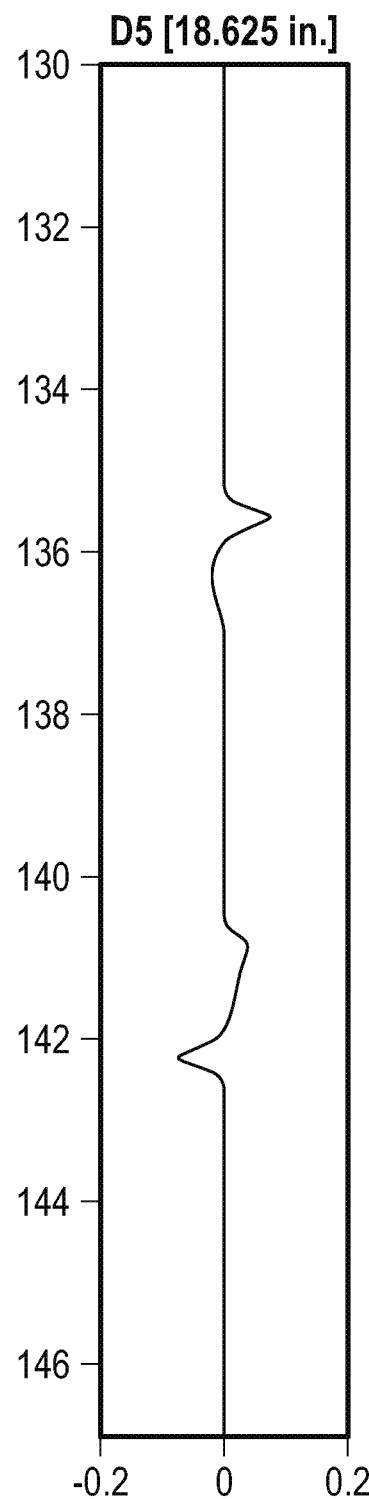
Figure 8F:
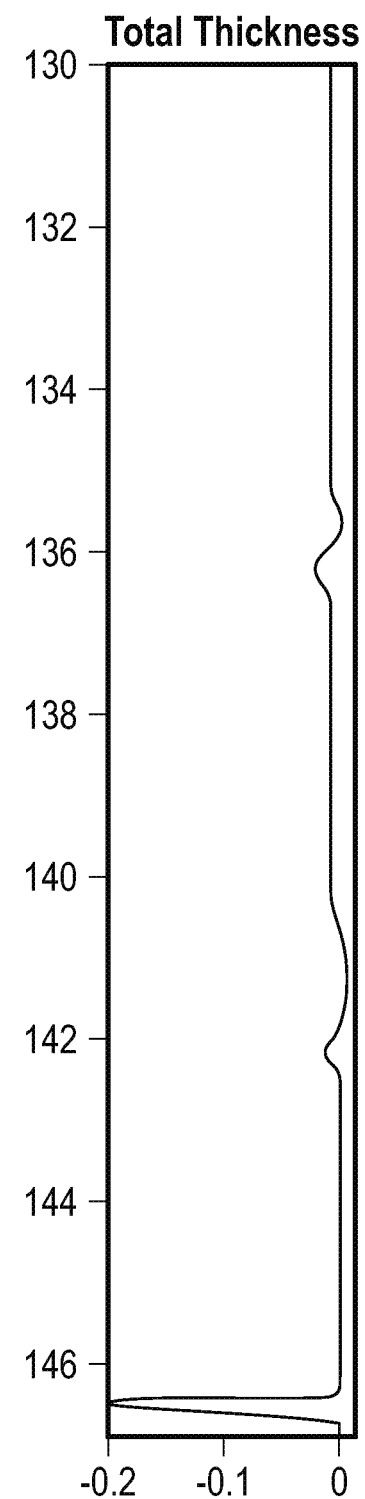

FIG. 6 illustrates a flowchart for an example method of an alternative method of computing total thickness directly from raw measurements to account for artifacts created in analyzing the integrity of pipes. The method shown in FIG. 6 is provided by way of example, as there are a variety of ways to carry out the method. Additionally, while the example method is illustrated with a particular order of steps, those of ordinary skill in the art will appreciate that FIG. 6 and the modules shown therein can be executed in any order and can include fewer or more modules than illustrated. Each module shown in FIG. 6 represents one or more steps, processes, methods or routines in the method.

While FIG. 6 is described with respect to pipe thickness, the method can be applied to an applicable attribute of a pipe. At step 600 measurements made by an electromagnetic pipe inspection tool, such as the electromagnetic pipe inspection tool 200 represented in FIG. 2, are accessed. Specifically, the measurements can be associated with a plurality of pipes downhole. At step 602, a total estimate of thickness for the plurality of pipes as a whole across different depth points are determined directly from the raw measurements. The total thickness can be determined through an applicable technique, such as the techniques described herein. For example, the total thickness can be determined directly from the measurements using either a regression function or a machine learning model.

At step 604, an inversion is applied to the measurements to determine corresponding initial estimates of the thickness for each pipe of the plurality of pipes. Next, at step 606, a cumulative thickness is determined from the corresponding initial estimates of the thickness for each pipe that are determined at step 604.

At step 608, the total thickness determined at step 602 is calibrated to the cumulative thickness determined at step 606, e.g. using a high order curve fitting. Specifically, the total estimate of the thickness for the plurality of pipes as a whole can be calibrated to a cumulative sum of the corresponding initial estimates of the thickness for the each pipe. More specifically, the calibration can include curve fitting between the total estimate of the thickness for the plurality of pipes as the whole and the corresponding initial estimates of the thickness for each pipe.

The calibrated total estimate of the thickness for the plurality of pipes as a whole can be applied in filtering the corresponding initial estimates of the thickness for each pipe. More specifically, the calibrated total estimate of thickness/total thickness across the pipes as a whole, can be compared, at decision point 610, to a threshold to determine if the estimate of thickness fits the error threshold. A fitting error, e.g. in relation to the calibration curve fitting, can be used as a quality indicator of the inversion performed in determining the individual pipe thicknesses at step 604. Specifically, at step 612 the inversion settings can be refined based on the fitting error in relation to the threshold. For example, if the fitting error is greater than a preset threshold, e.g. 5% or 10%, the inversion parameters are adjusted until a better match between the cumulative thickness and the total thickness is obtained.

Once the fit error is found to be within a threshold at decision point 510, the calibrated total thickness is applied to the individual thickness that are used in computing the resultant compute cumulative thickness at step 606. Specifically, the calibrated total thickness can be applied in filtering the individual thicknesses to remove artifacts. As follows and as discussed with respect to FIG. 4, the filtered thickness estimates can be used in assessing the integrity of the pipes.

As an illustrative example, an experiment was performed on a mimic borehole model with five concentric pipes. The parameters of the pipes are summarized in Table 1. The well is logged with a frequency domain electromagnetic pipe inspection tool. The tool is kept centralized within the tubing using tool centralizers. The tool in this example has two group of transmitting-receiving arrays. Measurements were performed at different frequencies ranging from very low to high.

TABLE 1

| Parameters of the pipes | | | | | |
|---|---|---|---|---|---|
| Pipe | 1st | 2nd | 3rd | 4th | 5th |
| OD (inch) | 2.875 | 7.0 | 9.625 | 13.375 | 18.625 |
| Thickness(inch) | 0.217 | 0.317 | 0.395 | 0.43 | 0.435 |

After the estimation of pipe electrical properties, the measurement data is calibrated to eliminate any model discrepancy between numerical modeling and real tool model. The calibrated measurement is fed to an inversion solver to estimate individual pipe thickness. Through the joint processing of multi-spacing measurements, the point-wise individual pipe thickness can be estimated.

FIGS. 7A-F are graphs of pipe thickness as a function of depth for different pipes and an overall cumulative thickness of the pipes as a function of depth. The thicknesses shown in FIGS. 7A-F include true thicknesses, initial thicknesses, and processed thicknesses. FIGS. 8A-F are corresponding derivatives of the thicknesses of the pipes and the cumulative thickness as a function of depth. It can be seen that all individual curves follow the total thickness for most parts, for example at the interval 130~135 ft, 137.2~140.5 ft, and 144~146.5 ft. However, the individual thickness of the 4th pipe, FIG. 7D, between 135 and 137 ft and between 140.6 and 143.7 ft does not conform with the total thickness. The derivative within these two regions are much higher than that of total thickness curve. The derivate is even opposite to the curve of total thickness. It can be also observed that the curve of the 5th pipe, FIG. 7E, has the opposite trend to the 4th pipe. The inversion result is affected by the corrosion edge on 4th pipe. The artifacts might arise from the one-dimensional model mismatch when the tool encounters two-dimensional features or from the inherent non-uniqueness of the inversion process. The thickness of the 4th and 5th pipes compensate each other near the edges of the defects. All of these observations indicate that the artifacts within these range need to be removed. Thus, the depth range of 135.4~136.8 ft and 140.6~142.4 ft are marked as interval with artifacts for processing. Then PCHIP can be used to calculate the value of marked region. It can be seen from the processed curves in FIGS. 7D and 7E that the two dips on the 4th pipe within the depth range of 135.4~136.8 ft and 140.6~142.4 ft and the two horns on the 5th pipe at the same intervals are absent. The reconstructed value within these two intervals are in closer agreement with the true pipe thickness. The shape of the 4th and 5th pipe curves are well preserved and the total thickness curve shown in FIG. 7F remains relatively unchanged.

Figure 9:
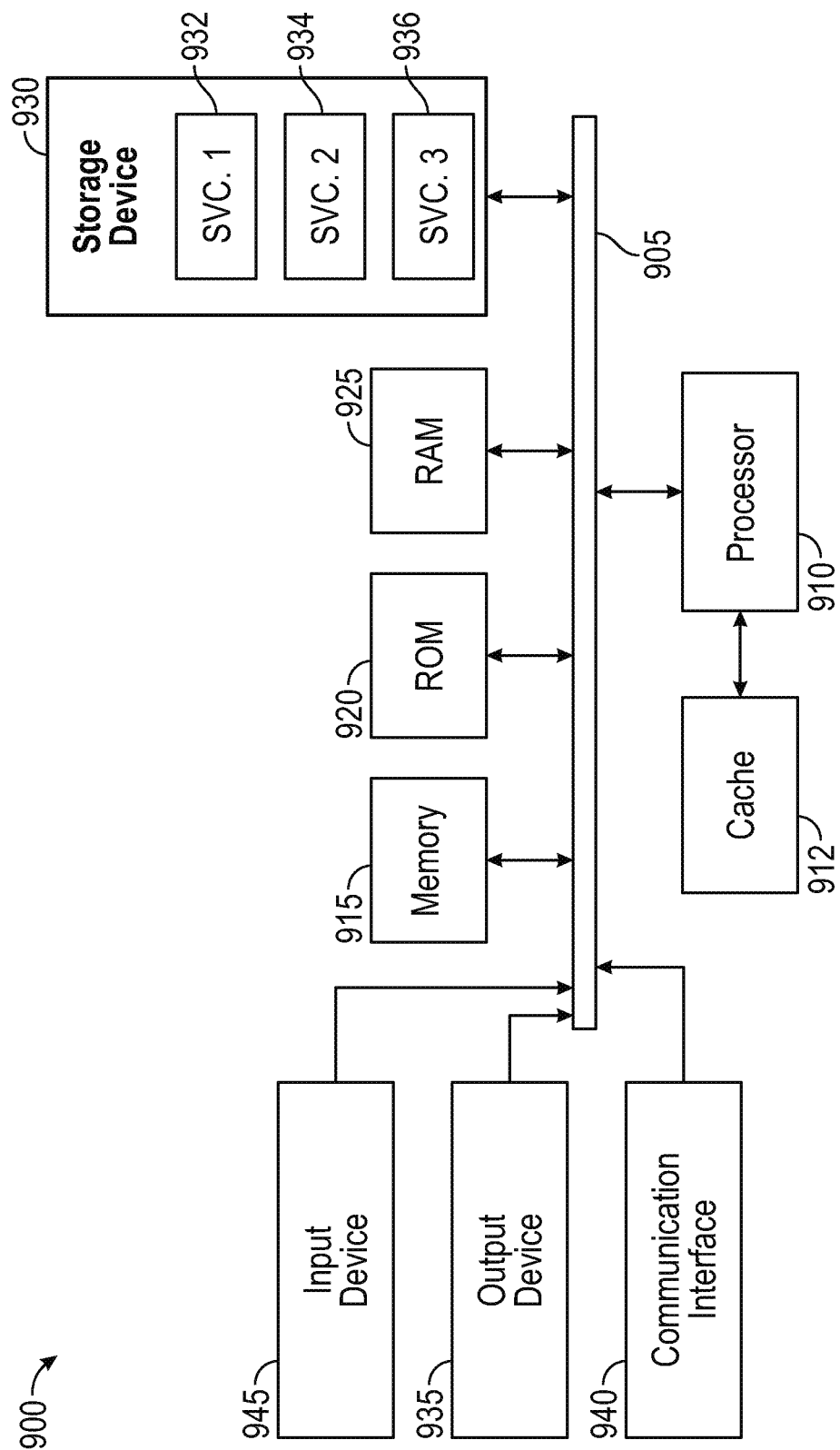
FIG. 9 illustrates an example computing device architecture which can be employed to perform various steps, methods, and techniques disclosed herein.

FIG. 9 illustrates an example computing device architecture 900 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 9 illustrates an example computing device architecture 900 of a computing device which can implement the various technologies and techniques described herein. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device, etc. In some instances, multimodal computing devices can enable a user to provide multiple types of input to communicate with the computing device architecture 900. The communications interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include services 932, 934, 936 for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1. A method comprising accessing measurements at different depth points of a plurality of pipes in a downhole environment. The method can also comprise determining an initial estimate of an attribute associated with the plurality of pipes for each pipe of the plurality of pipes across the different depth points based on the measurements. Further, the method can comprise identifying a total estimate of the attribute for the plurality of pipes as a whole across the different depth points. Additionally, the method can comprise filtering the corresponding initial estimates of the attribute for the each pipe of the plurality of pipes to remove an artifact present in at least one of the corresponding initial estimates of the attribute present across at least a portion of the different depth points while preserving the total estimate of the attribute. The method can also comprise determining corresponding final estimates of the attribute for the each pipe of the plurality of pipes based on both the measurements and corresponding filtered initial estimates of the attribute for the each pipe of the plurality of pipes. Further, the method can comprise identifying an integrity of a pipe of the plurality of pipes based on a corresponding final estimate of the attribute for the pipe.

Statement 2. The method of statement 1, wherein the measurements are gathered by an electromagnetic pipe inspection tool with at least one transmitter coil and at least one receiver coil.

Statement 3. The method of statements 1 and 2, wherein the electromagnetic pipe inspection tool operates either in a time-domain or a frequency-domain.

Statement 4. The method of statements 1 through 3, wherein determining the initial estimate of the attribute for each pipe of the plurality of pipes includes applying calibration, applying model-based inversion, applying supervised machine learning, or a combination thereof.

Statement 5. The method of statements 1 through 4, wherein the model-based inversion is a radial one-dimensional inversion.

Statement 6. The method of statements 1 through 5, wherein the attribute associated with the plurality of pipes includes a thickness of the each pipe of the plurality of pipes, a magnetic permeability of the each pipe of the plurality of pipes, an electrical conductivity of the each pipe of the plurality of pipes, and an eccentricity between pipes of the plurality of pipes.

Statement 7. The method of statements 1 through 6, wherein filtering the corresponding initial estimates of the attribute for the each pipe of the plurality of pipes to remove the artifact further comprises comparing derivatives of the corresponding initial estimates of the attribute for the each pipe of the plurality of pipes to derivatives of the total estimate of the attribute for the plurality of pipes with respect to depth of the different depth points. Further, the method can comprise flagging depth intervals based on differences between absolute values of the derivatives of the corresponding initial estimates of the attribute for the each pipe of the plurality of pipes and absolute values of the derivatives of the total estimate of the attribute for the plurality of pipes in relation to a specific threshold. Additionally, the method can comprise excluding flagged depth intervals from the corresponding initial estimates of the attributes for the each pipe of the plurality of pipes to create gaps in the corresponding initial estimates of the attribute. The method can also comprise supplementing the gaps through interpolation to obtain a filtered initial estimate of the attribute for a pipe of the plurality of pipes. Further, the method can comprise computing a sum of unfiltered initial estimates of the attribute for corresponding pipes of the plurality of pipes by subtracting the sum of all filtered initial estimates of the attribute from the total estimate of the attribute. Additionally, the method can comprise selecting another pipe of the plurality of pipes and repeating the above process for the attribute on the another pipe of the plurality of pipes.

Statement 8. The method of statements 1 through 7, wherein the process of comparing the derivatives, flagging and excluding depth intervals, and interpolation is repeated iteratively until the differences between the absolute values of the derivatives of the corresponding initial estimates of the attribute for the each pipe of the plurality of pipes and the absolute values of the derivatives of the total estimate of the attribute for the plurality of pipes are less than or equal to the specific threshold across at least a portion of the different depth points.

Statement 9. The method of statements 1 through 8, wherein the process of filtering the corresponding initial estimates of the attribute for the each pipe of the plurality of pipes is applied sequentially to different pipes in an arbitrary order.

Statement 10. The method of statements 1 through 9, wherein either or both the derivatives of the corresponding initial estimates of the attribute and the derivatives of the total estimate of the attribute include a first derivative as well as higher order derivatives with respect to depth.

Statement 11. The method of statements 1 through 10, wherein the specific threshold is 30%, 20%, 10%, or 0%.

Statement 12. The method of statements 1 through 11, wherein the total estimate of the attribute for the plurality of pipes as whole is identified by either summing up the corresponding initial estimates of the attribute or a filtered version of a sum of the corresponding initial estimates of the attribute.

Statement 13. The method of statements 1 through 12, wherein the total estimate of the attribute is identified directly from the measurements using a process that is substantially different from a process used to calculate the corresponding initial estimates of the attribute.

Statement 14. The method of statements 1 through 13, wherein the artifact arises from RIM model mismatch created when a tool that gathers the measurements encounters 2-D features or from an inherent non-uniqueness of an applied inversion process.

Statement 15. The method of statements 1 through 14, wherein the corresponding final estimates of the attribute are used as an initial guess to a second inversion.

Statement 16. A method comprising accessing measurements at different depth points of a plurality of pipes in a downhole environment. The method can also comprise determining a total estimate of thickness for the plurality of pipes as a whole across the different depth points based on the measurements. Further, the method can comprise determining corresponding initial estimates of the thickness for each pipe of the plurality of pipes based on the measurements. Additionally, the method can comprise filtering the corresponding initial estimates of the thickness for the each pipe to remove an artifact present in at least one of the corresponding initial estimates of the thickness across at least a portion of the different depth points. The corresponding initial estimates of the thickness for the each pipe can be filtered based on the total estimate of thickness for the plurality of pipes as the whole. The filtering can be performed while preserving the total estimate of the thickness for the plurality of pipes as the whole; The method can also comprise identifying an integrity of a pipe of the plurality of pipes based on a corresponding filtered initial estimate of the thickness of the pipe.

Statement 17. The method of statement 16, wherein the total estimate of the thickness for the plurality of pipes as the whole is calibrated to a cumulative sum of the corresponding initial estimates of the thickness for the each pipe and a calibrated total estimate of the thickness for the plurality of pipes as the whole is applied in filtering the corresponding initial estimates of the thickness for the each pipe.

Statement 18. The method of statements 16 and 17, wherein the calibration comprises curve fitting between the total estimate of the thickness for the plurality of pipes as the whole and the corresponding initial estimates of the thickness for the each pipe.

Statement 19. The method of statements 16 through 18, wherein the total estimate of the thickness for the plurality of pipes as the whole is computed directly from the measurements using either a regression function or a machine learning model.

Statement 20. A system comprising one or more processors and at least one computer-readable storage medium having stored therein instructions. The instructions which, when executed by the one or more processors, cause the one or more processors to access measurements at different depth points of a plurality of pipes in a downhole environment. The instructions can also cause the one or more processors to determine an initial estimate of an attribute associated with the plurality of pipes for each pipe of the plurality of pipes across the different depth points based on the measurements. Further, the instructions can cause the one or more processors to identify a total estimate of the attribute for the plurality of pipes as a whole across the different depth points based on corresponding initial estimates of the attribute for the each pipe of the plurality of pipes across the different depth points. Additionally, the instructions can cause the one or more processors to filter the corresponding initial estimates of the attribute for the each pipe of the plurality of pipes to remove an artifact present in at least one of the corresponding initial estimates of the attribute present across at least a portion of the different depth points while preserving the total estimate of the attribute. The instructions can also cause the one or more processors to determine corresponding final estimates of the attribute for the each pipe of the plurality of pipes based on both the measurements and corresponding filtered initial estimates of the attribute for the each pipe of the plurality of pipes. Further, the instructions can cause the one or more processors to identify an integrity of a pipe of the plurality of pipes based on a corresponding final estimate of the attribute for the pipe.

What is claimed is:

1. A method comprising:
accessing measurements at different depth points of a plurality of pipes in a downhole environment;
determining an initial estimate of an attribute associated with the plurality of pipes for each pipe of the plurality of pipes across the different depth points based on the measurements;
identifying a total estimate of the attribute for the plurality of pipes as a whole across the different depth points;
filtering the corresponding initial estimates of the attribute for the each pipe of the plurality of pipes to remove an artifact present in at least one of the corresponding initial estimates of the attribute present across at least a portion of the different depth points while preserving the total estimate of the attribute;
determining corresponding final estimates of the attribute for the each pipe of the plurality of pipes based on both the measurements and corresponding filtered initial estimates of the attribute for the each pipe of the plurality of pipes; and
identifying an integrity of a pipe of the plurality of pipes based on a corresponding final estimate of the attribute for the pipe.

2. The method of claim 1, wherein the measurements are gathered by an electromagnetic pipe inspection tool with at least one transmitter coil and at least one receiver coil.

3. The method of claim 2, wherein the electromagnetic pipe inspection tool operates either in a time-domain or a frequency-domain.

4. The method of claim 1, wherein determining the initial estimate of the attribute for each pipe of the plurality of pipes includes applying calibration, applying model-based inversion, applying supervised machine learning, or a combination thereof.

5. The method of claim 4, wherein the model-based inversion is a radial one-dimensional inversion.

6. The method of claim 1, wherein the attribute associated with the plurality of pipes includes a thickness of the each pipe of the plurality of pipes, a magnetic permeability of the each pipe of the plurality of pipes, an electrical conductivity of the each pipe of the plurality of pipes, and an eccentricity between pipes of the plurality of pipes.

7. The method of claim 1, wherein filtering the corresponding initial estimates of the attribute for the each pipe of the plurality of pipes to remove the artifact further comprises:
    comparing derivatives of the corresponding initial estimates of the attribute for the each pipe of the plurality of pipes to derivatives of the total estimate of the attribute for the plurality of pipes with respect to depth of the different depth points;
    flagging depth intervals based on differences between absolute values of the derivatives of the corresponding initial estimates of the attribute for the each pipe of the plurality of pipes and absolute values of the derivatives of the total estimate of the attribute for the plurality of pipes in relation to a specific threshold;
    excluding flagged depth intervals from the corresponding initial estimates of the attributes for the each pipe of the plurality of pipes to create gaps in the corresponding initial estimates of the attribute;
    supplementing the gaps through interpolation to obtain a filtered initial estimate of the attribute for a pipe of the plurality of pipes.

8. The method of claim 7, wherein the process of comparing the derivatives, flagging and excluding depth intervals, and interpolation is repeated iteratively until the differences between the absolute values of the derivatives of the corresponding initial estimates of the attribute for the each pipe of the plurality of pipes and the absolute values of the derivatives of the total estimate of the attribute for the plurality of pipes are less than or equal to the specific threshold across at least a portion of the different depth points.

9. The method of claim 7, wherein the process of filtering the corresponding initial estimates of the attribute for the each pipe of the plurality of pipes is applied sequentially to different pipes in an arbitrary order.

10. The method of claim 7, wherein either or both the derivatives of the corresponding initial estimates of the attribute and the derivatives of the total estimate of the attribute include a first derivative as well as higher order derivatives with respect to depth.

11. The method of claim 7, wherein the specific threshold is 30%, 20%, 10%, or 0%.

12. The method of claim 1, wherein the total estimate of the attribute for the plurality of pipes as whole is identified by either summing up the corresponding initial estimates of the attribute or a filtered version of a sum of the corresponding initial estimates of the attribute.

13. The method of claim 1, wherein the total estimate of the attribute is identified directly from the measurements using a process that is substantially different from a process used to calculate the corresponding initial estimates of the attribute.

14. The method of claim 1, wherein the artifact arises from RID model mismatch created when a tool that gathers the measurements encounters 2-D features or from an inherent non-uniqueness of an applied inversion process.

15. The method of claim 1, wherein the corresponding final estimates of the attribute are used as an initial guess to a second inversion.

16. A method comprising:
    accessing measurements at different depth points of a plurality of pipes in a downhole environment;
    determining a total estimate of thickness for the plurality of pipes as a whole across the different depth points based on the measurements;
    determining corresponding initial estimates of the thickness for each pipe of the plurality of pipes based on the measurements;
    filtering the corresponding initial estimates of the thickness for the each pipe to remove an artifact present in at least one of the corresponding initial estimates of the thickness across at least a portion of the different depth points, wherein:
        the corresponding initial estimates of the thickness for the each pipe are filtered based on the total estimate of thickness for the plurality of pipes as the whole;
        the filtering is performed while preserving the total estimate of the thickness for the plurality of pipes as the whole; and
    identifying an integrity of a pipe of the plurality of pipes based on a corresponding filtered initial estimate of the thickness of the pipe.

17. The method of claim 16, wherein the total estimate of the thickness for the plurality of pipes as the whole is calibrated to a cumulative sum of the corresponding initial estimates of the thickness for the each pipe and a calibrated total estimate of the thickness for the plurality of pipes as the whole is applied in filtering the corresponding initial estimates of the thickness for the each pipe.

18. The method of claim 17, wherein the calibration comprises curve fitting between the total estimate of the thickness for the plurality of pipes as the whole and the cumulative sum of the corresponding initial estimates of the thickness for the each pipe.

19. The method of claim 16, wherein the total estimate of the thickness for the plurality of pipes as the whole is computed directly from the measurements using either a regression function or a machine learning model.

20. A system comprising:
    one or more processors; and
    at least one computer-readable storage medium having stored therein instructions which, when executed by the one or more processors, cause the one or more processors to:
        access measurements at different depth points of a plurality of pipes in a downhole environment;
        determine an initial estimate of an attribute associated with the plurality of pipes for each pipe of the plurality of pipes across the different depth points based on the measurements;
        identify a total estimate of the attribute for the plurality of pipes as a whole across the different depth points;
        filter the corresponding initial estimates of the attribute for the each pipe of the plurality of pipes to remove an artifact present in at least one of the corresponding initial estimates of the attribute present across at least a portion of the different depth points while preserving the total estimate of the attribute;

determine corresponding final estimates of the attribute for the each pipe of the plurality of pipes based on both the measurements and corresponding filtered initial estimates of the attribute for the each pipe of the plurality of pipes; and identify an integrity of a pipe of the plurality of pipes based on a corresponding final estimate of the attribute for the pipe.

* * * * *